Aug. 14, 1923.
F. O. MURO
PNEUMATIC TIRE
Filed Jan. 13, 1923
1,465,169
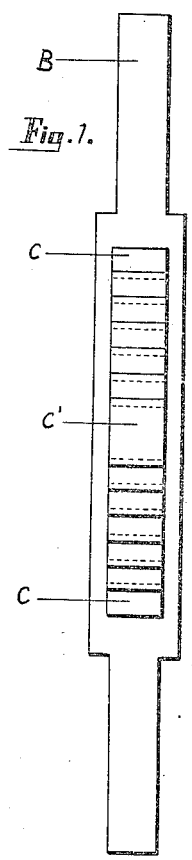
Fig. 1.
Fig. 2.
Fig. 3.
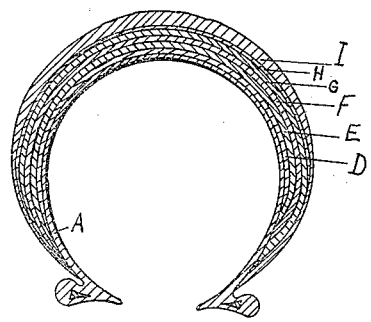
Fig. 4.
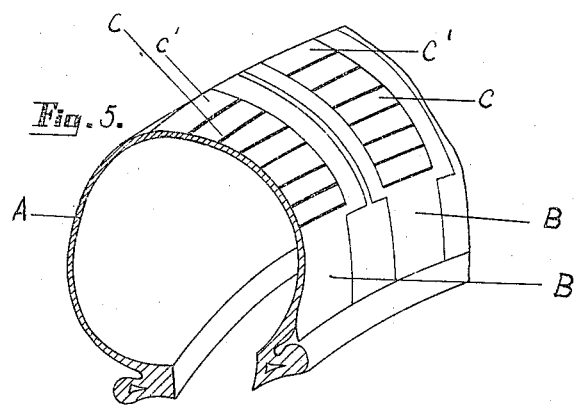
Fig. 5.
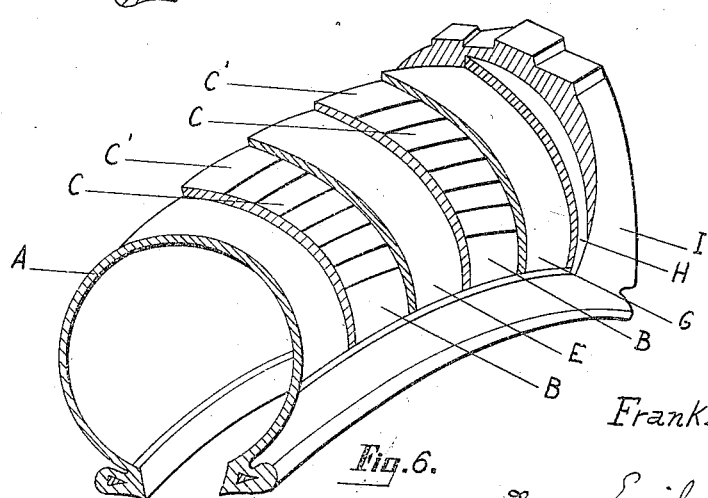
Fig. 6.
Inventor
Franklin Orive Muro
By Emil Bönnelycke
Attorney Patented Aug. 14, 1923.

1,465,169

UNITED STATES PATENT OFFICE.

FRANKLIN ORIVE MURO, OF BUENOS AIRES, ARGENTINA.

PNEUMATIC TIRE.

Application filed January 13, 1923. Serial No. 612,489.

*To all whom it may concern:*

Be it known that I, FRANKLIN ORIVE MURO, subject of the King of Spain, residing at 764 Granaderos Street, Buenos Aires, Argentina, have invented certain new and useful Improvements in Pneumatic Tires, of which the following is a specification.

My invention relates to an improved resilient tire for the wheels of motorcars, motor-cycles, cycles and the like, its object being to provide an improved tire which is perfectly puncture-proof and invulnerable to the usual accidents which are liable to injure the resilient bandages.

The invention consists essentially in constructing an armoured tire, said tire being constituted of a metallic armour placed in two series of armoured strips each series being separated from the other by a layer of gummed canvas and the strip of the outer series corresponding to the free spaces between the strips of the inner series. A tire constructed as above has the same elasticity and resiliency as the usual tires and has further a much longer life.

In order that my invention may be clearly understood and easily carried into practice a preferred embodiment of the same has been illustrated in the appended drawings, wherein Figure 1 is a plan view of an armoured strip with the armour plates fixed thereon.

Figure 2 is a transverse section of a central armour plate.

Figure 3 is a transverse section of one of the lateral armour plates.

Figure 4 is a transverse diagrammatical section of the tire.

Figure 5 is a perspective view showing the general disposition of the inner layer of the armour.

Figure 6 is a perspective view of a part of a tire with sections showing the position of the different layers.

Similar characters of reference denote same or like parts throughout the said figures.

The tire according to my present invention is constructed as follows:

The base of the tire is formed by two or more gummed canvas layers A on which the armoured strips are duly placed. Said armoured strips are constituted by a gummed canvass strip C to which the armour plates B and C' are duly fixed. The central armour plates C' are double sized in order to cover both sides of the tire. The armoured strips are placed so as to leave between them a space substantially equal or less to the width of each of them, said space being covered with an india-rubber strip, which on being vulcanized, perfectly connects all the armoured strips. Said series of armoured and india-rubber strips form a layer as shown in D. Said layer is covered by an india rubber layer E which embraces all the tire up to the heels. After this layer a second series of armoured strips is laid on, the armoured strips being so placed as to cover the free spaces between the armoured strips of the first layer. In the spaces between the said armoured strips, new strips of india rubber or duly placed, which on being vulcanized form together with the armoured strips of the second series a new layer as shown in F.

The free ends of the canvas of the layer F enter the free spaces between the ends of the layers in D, a continuous succession of layers being formed thereby. Said ends surround the heel of the tire and terminate at the inner side of the cover.

A new layer of india rubber is placed on this second layer of armoured plates as shown in G and on this layer a new layer of gummed canvas H is fixed, said layer covering the whole surface of the tire and terminating within the same.

Finally, a thick layer of india rubber is placed on the tire, said layer forming the outer surface or thread I. The whole is submitted to vulcanization by the ordinary processes.

A tire constructed according to my present invention is perfectly puncture-proof, as any nail or like cutting or puncturing means must necessarily strike against the armour plates C or C' of one of the layers and is thereby held. The resiliency of the tire is unimpaired as the armour plates C and C' which are overlapping each other, are capable of a sufficient movement to allow of this resiliency. The armour plates are fixed to the respective strips of canvas by means of gripping devices.

It is obvious that many constructional and other changes may be introduced without departing from the scope of my present invention which has been clearly set forth in the appended claim.

Having now fully described and ascertained the nature of my present invention and in what manner the same is to be carried into practice, I declare that what I claim and desire to protect by Letters Patent is:

A pneumatic tire comprising a fabric layer; a series of armoured strips extending transversely across said layer in spaced parallel relation; a layer of rubber on said armoured strips; a second series of spaced armoured strips arranged transversely across the layer of rubber and overlapping the strips of the first layer, said strips each comprising a backing strip having metal plates secured thereto; and a tread for said tire.

In testimony whereof I affix my signature.

FRANKLIN ORIVE MURO.